United States Patent
Yang et al.

(10) Patent No.: US 11,250,591 B2
(45) Date of Patent: Feb. 15, 2022

(54) TARGET DETECTION METHOD, SYSTEM, AND NON-VOLATILE STORAGE MEDIUM

(71) Applicant: BEIJING KUANGSHI TECHNOLOGY CO., LTD., Beijing (CN)

(72) Inventors: Tong Yang, Beijing (CN); Xiangyu Zhang, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 143 days.

(21) Appl. No.: 16/210,781

(22) Filed: Dec. 5, 2018

(65) Prior Publication Data

US 2019/0347828 A1 Nov. 14, 2019

(30) Foreign Application Priority Data

May 9, 2018 (CN) .................. 201810440205.X

(51) Int. Cl.
*G06T 7/73* (2017.01)
*G06K 9/00* (2006.01)
*G06K 9/62* (2006.01)

(52) U.S. Cl.
CPC ............ *G06T 7/75* (2017.01); *G06K 9/00523* (2013.01); *G06K 9/00563* (2013.01); *G06K 9/6277* (2013.01)

(58) Field of Classification Search
CPC .. G06T 7/75; G06K 9/00523; G06K 9/00563; G06K 9/6277; G06K 9/00; G06K 9/62; G06K 9/46

(Continued)

(56) References Cited

U.S. PATENT DOCUMENTS

2019/0019318 A1* 1/2019 Cinnamon ............ G06T 1/0007
2019/0050694 A1* 2/2019 Fukagai .................... G06T 7/74

(Continued)

FOREIGN PATENT DOCUMENTS

CN 104077577 A 10/2014
CN 105989572 A 10/2016

(Continued)

OTHER PUBLICATIONS

First Office Action for Chinese application No. 201810440205.X, dated May 6, 2020, with an English Translation.

*Primary Examiner* — Srilakshmi K Kumar
*Assistant Examiner* — Umair Ahsan
(74) *Attorney, Agent, or Firm* — Marshall, Gerstein & Borun LLP

(57) ABSTRACT

The present disclosure provides a target detection method, target detection system and non-volatile storage medium. The target detection method includes: acquiring an image to be detected and anchor parameters of preset type number, wherein the anchor parameters are parameters of an anchor set on the image to be detected, and each type of anchor parameters include an anchor scale and an anchor aspect ratio; inputting the image to be detected and the anchor parameters into a target detection model; and carrying out target detection on the image to be detected on the basis of the anchor parameters by the target detection model to obtain a detection result, the detection result including a category and/or a position of a target object included in the image to be detected.

14 Claims, 4 Drawing Sheets

(58) Field of Classification Search
USPC .......................................................... 382/103
See application file for complete search history.

(56) References Cited

U.S. PATENT DOCUMENTS

2019/0251333 A1* 8/2019 Wang ........................ G06K 9/36
2020/0125888 A1* 4/2020 Hacker ..................... G06T 7/97

FOREIGN PATENT DOCUMENTS

| CN | 106874894 A | | 6/2017 | |
|---|---|---|---|---|
| CN | 107038448 A | | 8/2017 | |
| CN | 107145908 A | | 9/2017 | |
| CN | 107220618 A | | 9/2017 | |
| CN | 107506763 A | | 12/2017 | |
| CN | 108009509 A | * | 5/2018 | ......... G06K 9/00825 |
| CN | 108009509 A | | 5/2018 | |

* cited by examiner

TARGET DETECTION METHOD, SYSTEM, AND NON-VOLATILE STORAGE MEDIUM

The present application claims priority of the Chinese Patent Application No. 201810440205.X, filed on May 9, 2018, the disclosure of which is incorporated herein by reference in its entirety as part of the present application.

TECHNICAL FIELD

Embodiments of the present disclosure relate to a target detection method, system, and a non-volatile storage medium.

BACKGROUND

For an existing target detection method based on deep learning, in the process of carrying out object detection, mostly an anchor needs to be used for predicting detection frame. In a specific implementation, a fixed type of anchor is usually set only in the training process of a target detection model, to obtain a network parameter suitable to the fixed type of anchor by the training. After training is ended, the network parameter of the target detection model is not changed any more, and subsequently target detection is carried out directly on the basis of the determined network parameter.

SUMMARY

In a first aspect, at least an embodiment of the present disclosure provides a target detection method, which comprise: acquiring an image to be detected and anchor parameters of preset type number, wherein the anchor parameters are parameters of an anchor set on the image to be detected; and each type of anchor parameters comprises an anchor scale and an anchor aspect ratio; inputting the image to be detected and the anchor parameters into a target detection model; and carrying out target detection on the image to be detected on basis of the anchor parameters by the target detection model so as to obtain a detection result, the detection result including a category and/or a position of a target object included in the image to be detected.

In a second aspect, at least an embodiment of the present disclosure further provides an object detection apparatus, which comprises an acquisition module, an input module and a detection module. The acquisition module is configured to acquire an image to be detected and a preset anchor parameter, wherein the anchor parameter is a parameter of an anchor set on the image to be detected; the input module is configured to input the image to be detected and the anchor parameter into a target detection model; and the detection module is configured to carry out target detection on the image to be detected on the basis of the anchor parameter by the target detection model so as to obtain a detection result, the detection result including a category and/or a position of a target included in the image to be detected.

In a third aspect, at least an embodiment of the present disclosure provides a target detection system, which comprises an image acquisition apparatus, a processor and a storage apparatus; the image acquisition apparatus is configured to acquire an image to be detected; and one computer program or more computer programs is stored on the storage apparatus, and the computer program executing a target detection method, which comprises: acquiring an image to be detected and anchor parameters of preset type number, wherein the anchor parameters are parameters of an anchor set on the image to be detected; and each type of anchor parameters comprises an anchor scale and an anchor aspect ratio; inputting the image to be detected and the anchor parameters into a target detection model; and carrying out target detection on the image to be detected on basis of the anchor parameters by the target detection model to obtain a detection result, the detection result including a category and/or a position of a target object included in the image to be detected.

In a fourth aspect, at least an embodiment of the present disclosure provide a computer readable non-volatile storage medium, storing a computer program in a non-transitory mode, and executing a target detection method when the computer program is operated by a processor, which comprises: acquiring an image to be detected and anchor parameters of preset type number, wherein the anchor parameters are parameters of an anchor set on the image to be detected; and each type of anchor parameters comprises an anchor scale and an anchor aspect ratio; inputting the image to be detected and the anchor parameters into a target detection model; and carrying out target detection on the image to be detected on basis of the anchor parameters by the target detection model to obtain a detection result, the detection result including a category and/or a position of a target object included in the image to be detected.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
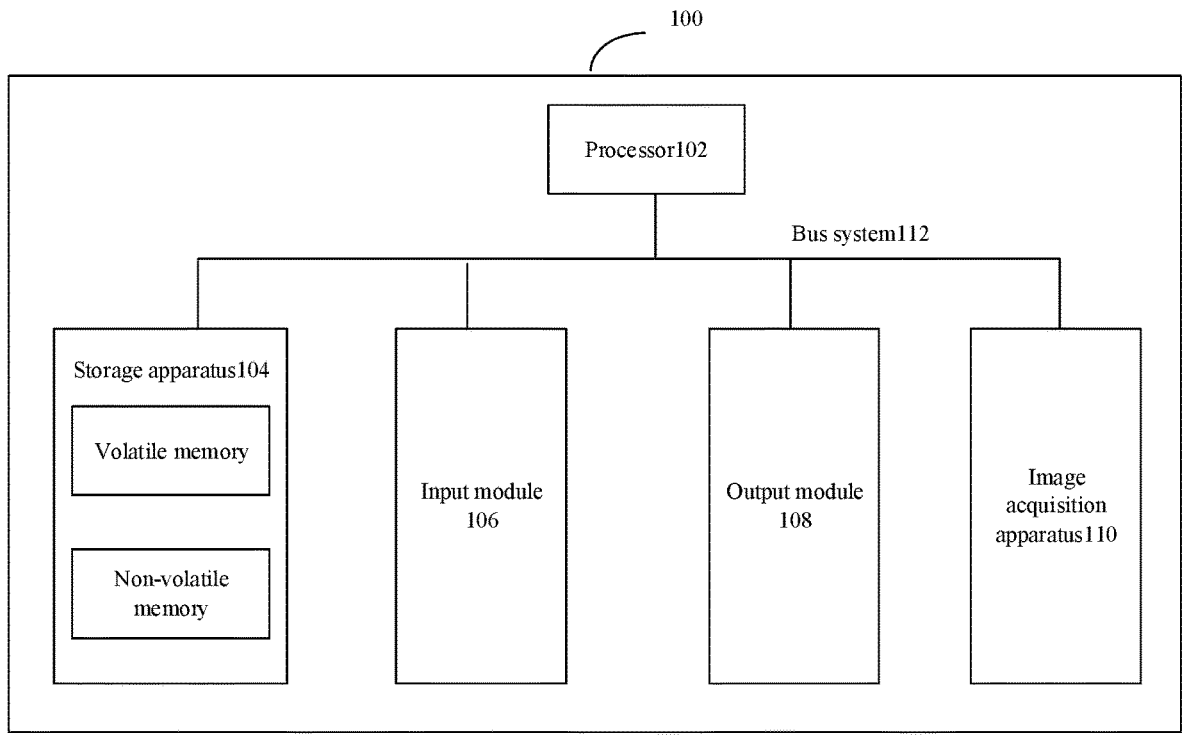
FIG. 1 shows a structural schematic diagram of an electronic device provided by embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Upper", "lower", "left", "right", etc. are only used to indicate the relative positional relationship, and when the absolute position of the object to be described is changed, the relative positional relationship may also change accordingly.

The embodiments of the present disclosure are described in detail below, and examples of the embodiments are shown as in the drawings, wherein the same or similar reference numerals are used to refer to the same or similar elements or elements having the same or similar functions. The embodiments described below with reference to the accompanying drawings are intended to be illustrative, and are not to be construed as limiting.

A target detection model uses a limited number of types of anchors in the training process, and a scale range which can be covered by the anchors is limited, resulting in that an object sample coverage rate is relatively low, which is difficult to cover special objects to be detected (e.g., objects with specific aspects, such as a pencil and the like), and thus, the target detection model which has been trained to have a fixed network parameter cannot detect out the specific objects from an image to be detected in the practical application, and a detection result is not accurate.

In consideration of the problem of relatively low detection accuracy caused by a case that the above-mentioned target detection method is limited to the insufficiency of the types of the anchors and the relatively low object sample coverage rate, in order to improve the problem, embodiments of the present disclosure provide a target detection method, a target detection system and a storage medium. The embodiments of the present disclosure will be illustrated in detail below.

At least one embodiment of the present disclosure provides a target detection method, including: acquiring an image to be detected and anchor parameters of preset type number, the anchor parameters being parameters of an anchor set on the image to be detected, and each type of anchor parameters including an anchor scale and an anchor aspect ratio; inputting the image to be detected and the anchor parameters into a target detection model; and carrying out target detection on the image to be detected on basis of the anchor parameters by the target detection model to obtain a detection result, the detection result including a category and/or a position of a target object included in the image to be detected. At least one embodiment of the present disclosure further provides a target detection system and a non-volatile storage medium which are corresponding to the above-mentioned target detection method.

Firstly, with reference to FIG. 1, an exemplary electronic device 100 for implementing the target detection method, device and system according to the embodiments of the present disclosure will be described.

A structural schematic diagram of an electronic device as shown in FIG. 1, the electronic device 100 includes one processor 102 or more processors 102, one storage apparatus 104 or more storage apparatus 104, an input apparatus 106, an output apparatus 108 and an image acquisition apparatus 110, and those components are interconnected by a bus system 112 and/or other forms of connection mechanisms (not shown). It should be noted that the components and the structure of the electronic device 100 as shown in FIG. 1 are merely exemplary, but not limitative, and according to required, the electronic device may also have other components and structures.

The processor 102 may be implemented in at least one of hardware forms such as a Digital Signal Processor (DSP), a Field Programmable Gate Array (FPGA) and a Programmable Logic Array (PLA), the processor 102 may be a Central Processing Unit (CPU) or a combination of one or more of other forms of processing units with data processing capability and/or instruction execution capability, and other components in the electronic device 100 can be controlled to execute expected functions.

The storage apparatus 104 may include one or more computer program products, and the computer program product may include various forms of computer readable storage media, e.g., a volatile memory and/or a nonvolatile memory. The volatile memory, for example, may include a Random Access Memory (RAM) and/or a cache and the like. The nonvolatile memory, for example, may include a Read Only Memory (ROM), a hard disk, a flash memory and the like. One or more computer program instructions can be stored on the computer readable storage medium, and the processor 102 can operate the program instruction to achieve under-mentioned client functions (achieved by the processor) in the embodiments of the present disclosure and/or other expected functions. Various applications and various data, e.g., various data used and/or generated by the applications and the like, can also be stored in the computer readable storage medium.

The input apparatus 106 may be an apparatus for a user to input an instruction, and may include one or more of a keyboard, a mouse, a microphone, a touch screen and the like.

The output apparatus 108 may output various information (for example, images or sound) to the outside (for example, the user), and may include one or more of a display, a speaker and the like.

The image acquisition apparatus 110 can shoot an image (for example, a photo, a video and the like) expected by the user, and store the shot image in the storage apparatus 104 for other components to use.

Exemplarily, the exemplary electronic device for implementing an attack data generation method, apparatus and system according to the embodiments of the present disclosure may be implemented as an intelligent terminal, such as a smart phone, a tablet personal computer, a computer and the like.

Figure 2:
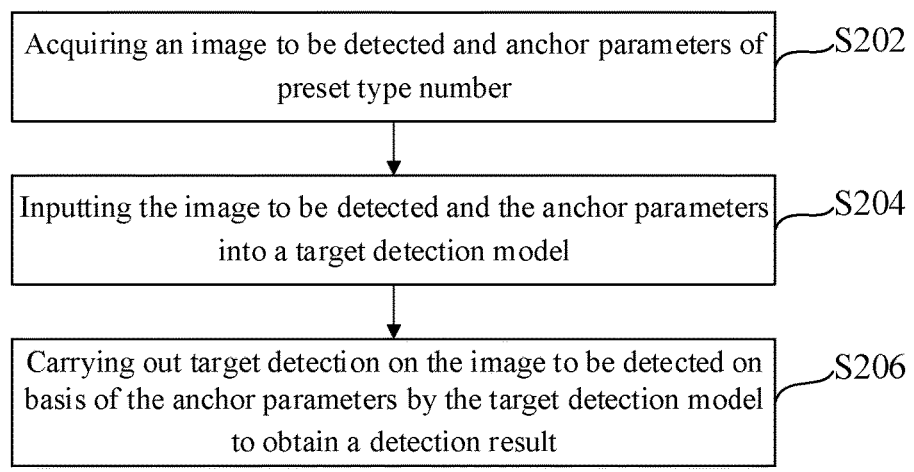
FIG. 2 shows a flow chart of a target detection method provided by embodiments of the present disclosure.

With reference to a flow chart of a target detection method as shown in FIG. 2, the method may be executed by the electronic device provided by the above-mentioned embodiment, and the method specifically includes the following steps:

Step S202: acquiring an image to be detected and anchor parameters of preset type number.

For example, the anchor parameters are parameters of an anchor set on the image to be detected; and each type of anchor parameters includes an anchor scale and an anchor aspect ratio.

The above-mentioned anchor can also be understood as an anchor frame, and specifically can be understood as an initial frame or a candidate region, and the anchor parameters include the anchor scale and the anchor aspect ratio. One type of anchor parameters (i.e., one group of anchor scale and anchor aspect ratio) can represent one type of anchor. For example, 3 types of scales and 3 types of aspects can be combined to form 9 types of anchors, 9 types of anchors can be correspondingly set at each position in the image to be detected, and for example, for a feature map with a size of W*H, the feature map includes W*H positions (which can be understood as W*H pixels), and then the W*H positions can correspond to W*H*9 anchors, i.e., correspond to W*H*9 initial frames.

Applying the anchor to carry out object detection is a common mode of a target detection model based on deep learning, and for example, a two-stage detector, such as a Faster R-CNN target detection model and the like, can use the anchor to firstly predict a candidate frame and then determine a detection frame; and a one-stage detector, such as a RetinaNet target detection model and the like, can use the anchor to directly predict the detection frame (which may also be called as an object frame) including a target object. In the practical application, most of the target detection models may adopt 9 or 25 types of anchors to predict the detection frame.

In order to well increase the anchor types, promote an object sample coverage rate and cover objects with various aspects to the greatest extent, the type number of the anchor parameters acquired in the embodiment should be greater than that of conventional anchor parameters.

Step S204: inputting the image to be detected and the anchor parameters into a target detection model. Specifically, the target detection model may be provided with an input terminal for the image to be detected and an input terminal for the anchor parameters. It should be understood that the target detection model generally includes various functional networks, such as a feature extraction network, a classification network, a regression network and the like, and the image to be detected and the anchor parameters specifically can be respectively input into different functional networks included in the target detection model.

Step S206: carrying out target detection on the image to be detected on basis of the anchor parameters by the target detection model to obtain a detection result.

For example, the detection result includes a category and/or a position of a target object included in the image to be detected.

When a detection model carries out the target detection, only the image to be detected needs to be input; generally only in a training stage, a fixed type of anchors are set and a network parameter applicable to the fixed type of anchors is obtained; after the training, the network parameter of the existing target detection model is not changed any more; in a test stage or a practical detection stage, the anchor parameters cannot be dynamically added, and object detection can only be carried out on the basis of the fixed anchor type set in the training process. However, the target detection model provided by the embodiment can be provided with the input terminal for the anchor parameters, so that external anchor parameters can be input to the target detection model. Namely, when the target detection model carries out detection on the image to be detected, not only can the image to be detected be acquired, but also the anchor parameters can be acquired from the outside, and dynamic detection is implemented on the basis of the acquired anchor parameters. It can be understood that after the anchor parameters are input to the target detection model of the embodiment, the network parameter of the target detection model can also be correspondingly changed on the basis of the anchor parameters so as to implement dynamic detection.

From the above, when the target detection is carried out on the image to be detected, the above-mentioned target detection method provided by the embodiment of the present disclosure can input the acquired various anchor parameters to the target detection model, so that the target detection model carries out the target detection on the image to be detected on the basis of the anchor parameters. Compared to the target detection model which is limited by the inherent anchor type of the network, the above-mentioned mode provided by the embodiment can enable the target detection model to acquire the anchor parameters from the outside when carrying out the target detection, and is convenient to increase the types of the anchors participating in target detection to promote the object sample coverage rate, thereby well promoting accuracy of the target detection.

In order to well increase the types of the anchors, promote the object sample coverage rate and cover the objects with the various aspects to the greatest extent, the type number of the anchor parameters in the embodiment should be more than that of the conventional anchor parameters, and in one implementation mode, the above-mentioned operating that acquiring the anchor parameters of preset type number may be executed according to the steps of:

(1) Searching various stored original anchor parameters that have been stored. It can be understood that the number of the types of the original anchor parameters that have been stored is generally relatively small, and the original anchor parameters are the anchor parameters commonly used by most of the target detection modes, and for example, only 9 types of anchor parameters including 3 types of anchor aspect ratios $\{1:2, 1:1, 2:1\}$ and 3 types of anchor scales $\{2^0, 2^{1/3}, 2^{2/3}\}$ are stored.

(2) Adding new anchor parameters on the basis of the various original anchor parameters according to a preset parameter expansion mode to reach the anchor parameters of preset type number.

In order to facilitate understanding, two expansion modes are given out below:

Expansion mode 1: carrying out sorting on the various original anchor parameters according to a size of the anchor scale and/or a size of the anchor aspect ratio; and carrying out interpolation processing between two adjacent original anchor parameters to add one or more new anchor parameters, until reaching the anchor parameters of preset type number. For example, the sizes of the anchor aspect ratios of the above 9 types of anchor parameters are sorted and sequentially are $\{1:2, 1:1, 2:1\}$, many new anchor aspect ratios, such as 2:3, 3:4, 5:6, 7:8, 7:12, 11:12 and the like, can be interpolated between 1:2 and 1:1, and an interpolation density can be set as required; and interpolation with respect to the anchor areas is also similar, and not repeated herein.

Expansion mode 2: determining a maximum anchor scale, a minimum anchor scale, a maximum anchor aspect ratio and a minimum anchor aspect ratio in the original anchor parameters; and adding new anchor parameters of which anchor scales are greater than the maximum anchor scale, and/or, adding new anchor parameters of which anchor scales are smaller than the minimum anchor scale, and/or, adding new anchor parameters of which anchor aspect ratios are greater than the maximum anchor aspect ratio, and/or, adding new anchor parameters of which anchor aspect ratios are smaller than the minimum anchor aspect ratio, until reaching the anchor parameters of preset type number. For example, when the minimum anchor aspect ratio in 3 types of anchor aspect ratios {1:2,1:1,2:1} is determined as 1:2 and the maximum anchor aspect ratio is determined as 2:1, new anchor aspect ratios smaller than 1:2, such as 1:3, 1:4, 2:5 and the like, can be added, and new anchor aspect ratios greater than 1:2, such as 3:1, 4:1, 5:1 and the like, can be added; and when the minimum anchor scale in 3 types of anchor scales $\{2^0, 2^{1/3}, 2^{2/3}\}$ is determined as $2^0$ and the maximum anchor scale is determined as $2^{2/3}$, new anchor scales smaller than $2^0$, such as $2^{-1}, 2^{-2}, 2^{-3}$ and the like, can be added, and new anchor scales greater than $2^{2/3}$, such as $2, 2^{4/3}, 2^{3/2}$ and the like, can be added.

In another implementation mode, the above-mentioned operating that acquiring the anchor parameters of preset type number may be executed according to the following steps:

(1) Acquiring a preset anchor parameter set. For example, the anchor parameter set includes various anchor parameters; in the various anchor parameters, a minimum difference of two anchor scales is lower than a preset first difference, and a maximum difference of two anchor scales is higher than a preset second difference; and/or, a minimum difference of two anchor aspect ratios is lower than a preset third difference, and a maximum difference of two anchor aspect ratios is higher than a preset fourth difference, wherein the first difference, the second difference, the third difference and the fourth difference all can be flexibly set as required, and the embodiments of the present disclosure do not limit the aspect.

In the practical application, the anchor parameter set can also be called as a meta anchor, and the meta anchor can be understood as a set of all the anchors. In an ideal state, the meta anchor can be a set of infinite anchors, and scales and aspects of the infinite anchors can also be understood as continuous values. A selection range of the anchor is relatively wide, which is beneficial for promoting a coverage rate of an object positive sample.

(2) Selecting the anchor parameters of preset type number from the anchor parameter set. Specifically, the anchor parameters can be actively selected by an artificial method, and can also be automatically selected by a preset selection mode.

It should be noted that according to the above-mentioned target detection model provided by the embodiment, in the training stage, the anchor parameters of preset type number (i.e., a fixed number of anchor groups), can be uniformly input in each training process, but the types of the input anchors in different times may be changed in real time. For example, 9 types of anchor parameters (i.e., 9 groups of anchor points) are input each time, the types of the anchor parameters input in different times are different, i.e., the number of the group can be fixed, but the type number of the anchors may be changed; and through repeated training, the target detection model can adjust the network parameter on the basis of numerous types of anchors, a proportional spacing among the anchor aspect ratios corresponding to numerous types of anchors is relatively small, a scale difference among the sizes of the anchor scales is also relatively small, thereby forming a plurality of dense anchors d, and the dense anchors are helpful for covering various different object positive samples and can promote the object sample coverage rate better.

Moreover, the above-mentioned target detection model provided by the embodiment can still receive the externally input anchor parameters when it is used (including the test stage and a practical application stage after testing), and the network parameter can be dynamically adjusted on the basis of the externally input anchor parameters to improve a detection effect. It should be noted that the anchor parameters input to the target detection model when the target detection model provided by the embodiment is used and the anchor parameters input to the target detection model when the target detection model is trained can be the same, and can also be different. In the specific implementation, the type number of the anchor parameters input when the target detection model provided by the embodiment is used can also be greater than the type number of the anchor parameters input when the target detection model is trained; and namely, the group number of the anchor parameters input for once can be increased with respect to the group number adopted in the training process, and for example, 9 groups are changed into 25 groups or 49 groups and the like. For the anchor parameters input to the target detection model when the target detection model is used, compared to the anchor parameters input to the target detection model in the training stage, not only can the group number be increased, but also the anchor parameter type corresponding to each group can also be changed; and when the above-mentioned target detection model is used, the anchor types input into the target detection model and the type number simultaneously input into the target detection model can be modified as required, so as to enlarge a scale range of anchor coverage to promote the object detection performance of the target detection model. Compared to the conventional target detection model limited to the preset anchor types after training, the reference and setting of the anchor parameters of the target detection model provided by the embodiment is more flexible, and the anchor type of the target detection model is also richer, and thus, in the practical application, the detection performance is more excellent.

Figure 3:
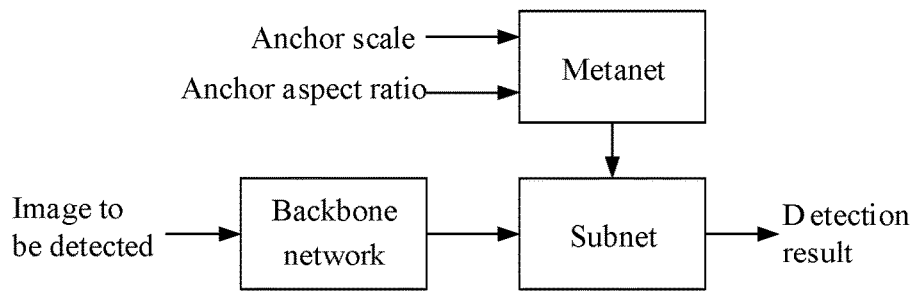
FIG. 3 shows a structural schematic diagram of a first target detection model provided by embodiments of the present disclosure.

Based on the above-mentioned target detection model, the embodiment provides a plurality of implementation modes of the target detection model, and the specific illustration is as follows:

Implementation Mode I:

With reference to a structural schematic diagram of a first target detection model as shown in FIG. 3, the target detection model includes a backbone network and a subnet connected with the backbone network, and further includes a metanet connected with the subnet.

For example, an input of the backbone network is the image to be detected, and an output of the backbone network is the feature map of the image to be detected; an input of the metanet is the anchor parameter, and an output of the metanet is a layer network parameter of the subnet; and inputs of the subnet are the feature map and the layer network parameter, and an output of the subnet is the detection result.

Based on the network structure of the above-mentioned target detection model, the above-mentioned step S206 may be executed with reference to the following steps:

(1) Carrying out feature extraction on the input image to be detected by the backbone network, to obtain the feature map of the image to be detected, and inputting the feature map into the subnet. Specifically, the backbone network is a primary network for feature extraction, and may include a plurality of convolution layers.

(2) Carrying out nonlinear mapping processing on the input anchor parameters by the metanet, to obtain the layer network parameter of the subnet, and inputting the layer network parameter into the subnet. It should be noted that the subnet is mostly a multilayer structure. And for example, the subnet includes a plurality of convolution layers, and the layer network parameter may be a parameter of one or more network layers included in the subnet and related to the anchor parameters. The metanet can carry out processing on all of the input anchor parameters and generate the layer network parameter of the subnet for outputting the detection result.

(3) Carrying out classification processing on the feature map on the basis of the layer network parameter by the subnet, and determining the category of the target object in the image to be detected, and/or, carrying out regression processing on the feature map on the basis of the layer network parameter, and determining the position of the target object in the image to be detected. The subnet may specifically include a classification subnet and a regression subnet, both the classification subnet and the regression subnet may be formed by a plurality of convolution layers, and a classification result (i.e., the position of the target object) and an object frame regression result (i.e., the position of the target object) are output by the last convolution layer.

Compared to a conventional target detection model only including the backbone network and the subnet, the above-mentioned target detection model provided by the embodiment introduces the metanet, the metanet mainly can be used for inputting the anchor parameters and outputting the layer network parameter of the subnet. The structural advantage of the target detection model provided by the embodiment is that the metanet is specially set to calculate the layer network parameter for the subnet on the basis of the input anchor parameters, and the subnet does not need to adjust the network parameter of the subnet on the basis of the anchor parameters, i.e., all the anchors to which the target detection model relates are subjected to centralized processing by the metanet, and the network parameter applicable to the input anchor is dynamically output for the subnet; and compared to the conventional target detection model without the metanet, the above-mentioned target detection model provided by the embodiment, on the basis of increasing the anchor types, also simplifies regulation complexity of the network parameter.

Moreover, for the conventional target detection model without the metanet, the training is carried out only on the basis of the limited types of anchors; after the training, the network parameter is not changed any more and the anchor types also cannot be increased; in the subsequent test stage and the practical application stage, the target detection can also be carried out only according to the anchor types for testing; and the conventional target detection model is largely limited to the inherent anchor types in the testing process, is insufficient in anchor coverage range and is low in object sample coverage rate. However, for the above-mentioned target detection model provided by the embodiment, through setting the metanet which can directly acquire the anchor parameters from the outside, when the anchor types introduced into the target detection model are increased by the metanet, the subnet for outputting the detection result does not need to adjust the parameter, the metanet can be directly utilized to dynamically adjust the network parameter (i.e., the above-mentioned layer network parameter) of the subnet on the basis of the anchor parameters and input the network parameter into the subnet, in the test stage and the practical application stage, the metanet can also be utilized to correspondingly change the network parameter according to the setting of the anchor parameters so as to change a static detection model into the dynamic detection model in the embodiment, and the setting of the metanet can enable the target detection model to increase the type number of the anchors after the training stage, and simply and conveniently carry out dynamic regulation on the network parameter of the subnet so as to well promote the object detection performance.

Figure 4:
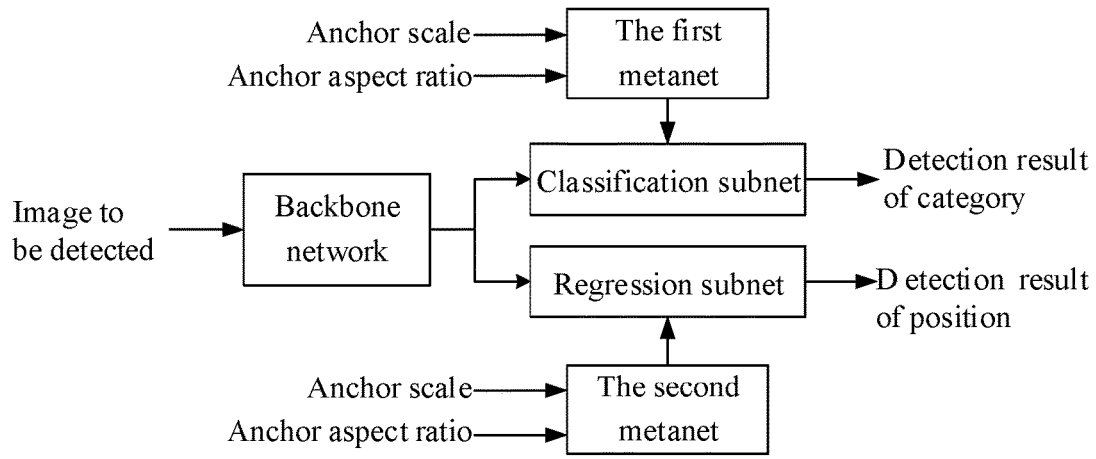
FIG. 4 shows a structural schematic diagram of a second target detection model provided by embodiments of the present disclosure.

Implementation Mode II:

With reference to a structural schematic diagram of a second target detection model as shown in FIG. 4, on the basis of the target network model provided by Implementation Mode I, the subnet as shown in FIG. 4 includes a classification subnet and a regression subnet; and the metanet includes a first metanet and a second metanet, wherein the first metanet is connected with the classification subnet, and the second metanet is connected with the regression subnet; and the layer network parameter includes a classification layer network parameter and a regression layer network parameter.

On the basis of the above-mentioned structure, in Implementation Mode I, the specific step of carrying out nonlinear mapping processing on the input anchor parameters by the metanet, to obtain the layer network parameter of the subnet, and inputting the layer network parameter into the subnet, includes that: carrying out nonlinear mapping processing on the input anchor parameters by the first metanet, to obtain the classification layer network parameter, and inputting the classification layer network parameter into the classification subnet; and carrying out nonlinear mapping processing on the input anchor parameters by the second metanet, to obtain the regression layer network parameter, and inputting the regression layer network parameter into the regression subnet.

The classification subnet with the classification layer network parameter can carry out probability prediction on each category of each anchor at each position so as to obtain the classification result; and the regression subnet with the regression layer network parameter can carry out regression on the basis of each anchor at each position and finally regress to the detection frame including the target object. The above-mentioned classification subnet and regression subnet provided by the embodiment are arranged in parallel, and thus, the metanets (the first metanet and the second metanet) which can generate the corresponding layer network parameters are respectively established by the classification subnet and the regression subnet to enable both the classification subnet and the regression subnet to acquire the respective layer network parameters by the connected metanets, so as to implement dynamic regulation.

Figure 5:
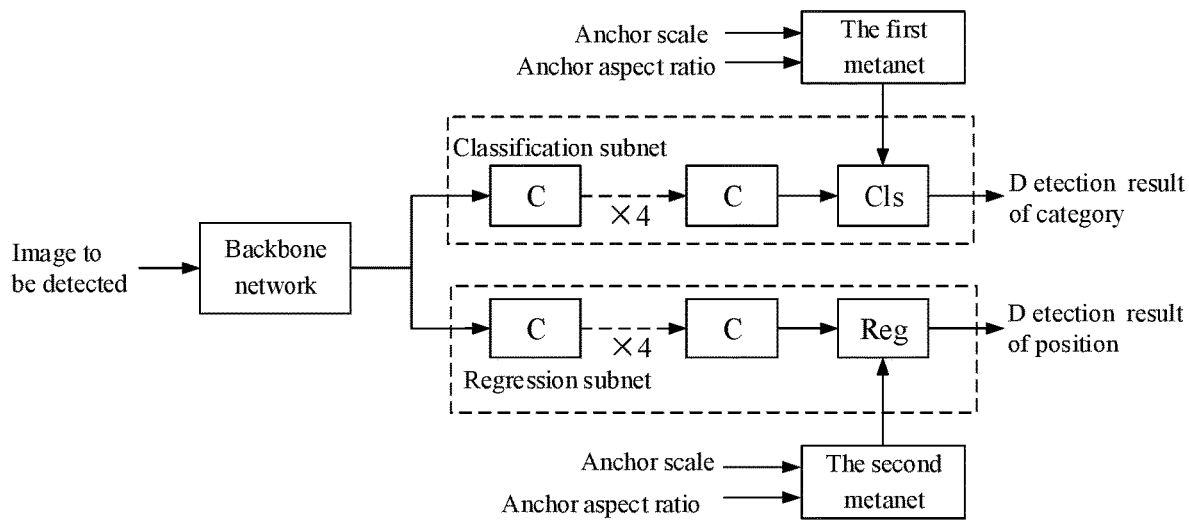
FIG. 5 shows a structural schematic diagram of a third target detection model provided by embodiments of the present disclosure.

Implementation Mode III:

With reference to a structural schematic diagram of a third target detection model as shown in FIG. 5, on the basis of the target network mode provided by Implementation Mode II, it is specifically indicated that the classification subnet includes a plurality of convolution layers, and the first metanet is connected with a classification result output layer of the classification subnet. For example, the classification layer network parameter is a network parameter of the classification result output layer; and the classification result output layer is an end convolution layer in the plurality of convolution layers in the classification subnet.

The regression subnet includes a plurality of convolution layers, and the second metanet is connected with a regression result output layer of the regression subnet. For example, the regression layer network parameter is a network parameter of the regression result output layer, and the regression result output layer is an end convolution layer in the plurality of convolution layers in the regression subnet.

As shown in FIG. 5, 5 convolution layers are respectively shown for the classification subnet and the regression subnet, and respectively are 4 convolution layers C and last convolution layers Cls and Reg for outputting the results. It can be seen that as shown in FIG. 5, the first metanet is connected with the last convolution layer Cls (i.e., the above-mentioned classification result output layer) of the classification subnet, the second metanet is connected with the last convolution layer Reg (i.e., the above-mentioned regression result output layer) of the regression subnet, and in the target network model in this implementation mode, the metanet is only connected with the last result output layer of the subnet and directly provides the network parameter for the result output layer. Such simple connection mode not only can meet the demand that the target detection model dynamically adjusts the parameter on the basis of the increased anchor types, but also is small in adjusted parameter amount and relatively low in parameter regulation difficulty of the metanet. Certainly, in the practical application, there are also other connection modes, which are not repeated in this aspect herein.

Figure 6:
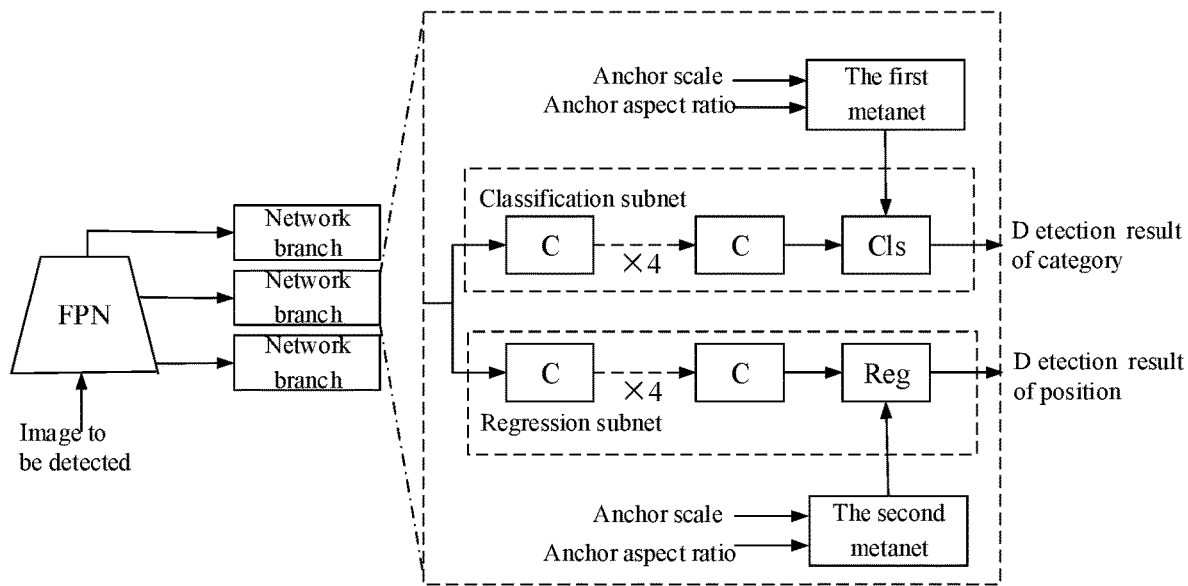
FIG. 6 shows a structural schematic diagram of a fourth target detection model provided by embodiments of the present disclosure.

Implementation Mode IV:

With reference to a structural schematic diagram of a fourth target detection model as shown in FIG. 6, on the basis of the target network model provided by Implementation Mode III, the backbone network in the implementation as shown in FIG. 6 is a Feature Pyramid Network (FPN), and a plurality of subnets are provided. For example, the number of the subnets corresponds to scale types of the feature maps output by the FPN. Each subnet is connected with the metanet. Specifically, FIG. 6 shows a plurality of network branches, each network branch comprises the classification subnet and the regression subnet, and also includes the first metanet connected with the classification subnet and the second metanet connected with the regression subnet. The number of the network branches corresponds to the scale types of the feature maps output by the FPN. For example, in a case where the FPN can output five scales of feature maps, the number of the network branches is 5. Network structures of different network branches are the same, and thus, only one network branch (which specifically adopts the network structure as shown in FIG. 5) is shown in an amplifying mode in FIG. 6, and other network branches will not be shown one by one.

In this implementation mode, the FPN is used as a backbone portion of the target detection model, and in order to facilitate understanding, the FPN will be further illustrated as follows: the FPN can be expanded by a top-to-bottom channel and a transverse connection to form a standard convolution network, so that a rich and multi-scale feature pyramid image can be effectively extracted from a single-resolution input image. The FPN includes multiple layers of structures, and each layer can carry out the detection on the image to be detected on different scales to generate multiple scales of feature maps. The FPN can well promote multi-scale prediction capability of a Full Convolution Network (FCN).

Figure 7:
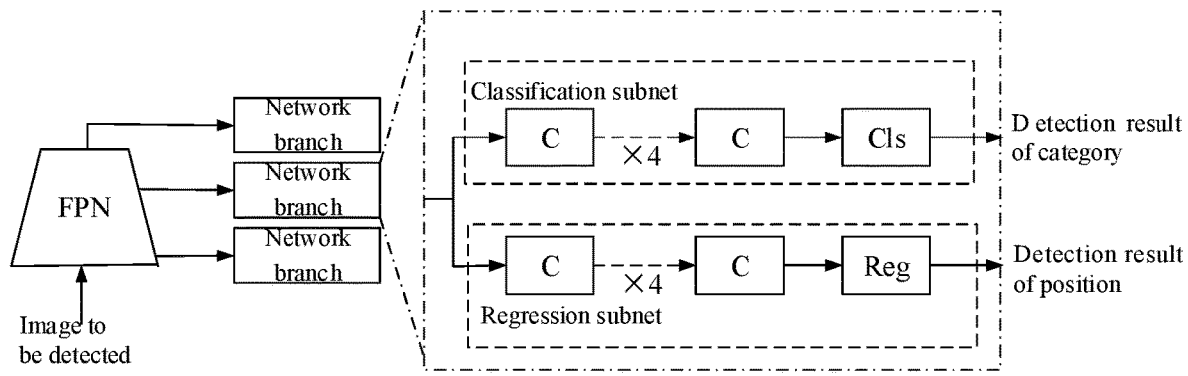
FIG. 7 shows a structural schematic diagram of a RetinaNet target detection model provided by embodiments of the present disclosure.

In practice, the fourth target detection model as shown in FIG. 6 is obtained by carrying out further improvement on the basis of the RetinaNet target detection model and the further improvement is adding the metanet. In order to further know the target network model as shown in FIG. 6, a structure schematic diagram of a RetinaNet target detection model as shown in FIG. 7 can be further referred to, and this implementation mode firstly explains the RetinaNet target detection model as follows:

The RetinaNet target detection model is a one-stage detector, and a network structure of the RetinaNet target detection model uses the FPN on a forward ResNet network structure to generate a rich and multi-scale convolution feature pyramid. The RetinaNet target detection model is a uniform network structure including one primary network FPN and two subnets (the classification subnet and the regression subnet) with designated tasks. The primary network FPN takes charge of calculating convolution features of the overall input image; the classification subnet is used for carrying out further calculation on an output of the primary network to complete a target classification, and specifically used for completing classification on the basis of the set anchors; and the regression subnet takes charge of frame regression, and specifically, takes charge of determining the detection frame including the target object on the basis of the set anchors.

The RetinaNet target detection model constructs the FPN at the top of the ResNet, and specifically, adopts P3 to P7 layers to construct the pyramid. For example, resolution of an $1^{th}$ layer is $1/2^1$ of a first layer.

Scales of the anchors applied in the RetinaNet target detection model correspond to regions from $32^2$ to $512^2$ on the P3 to P7 layers of the pyramid. At each pyramid level, the RetinaNet target detection model can use the anchors with various aspect ratios (i.e., aspects), such as $\{1:2, 1:1, 2:1\}$. In order to cover denser scales, 3 types of scales (i.e., scales), such as $\{2^0, 2^{1/3}, 2^{2/3}\}$, are also added on the basis of 3 types of original aspect ratios of each level. It is equivalent to that there are 3*3=9 types of anchors in total at each level of the RetinaNet target detection model, and in across the levels, those anchors can cover 32 to 813 pixels with respect to the size of an original image in total. One one-hot vector classification target with a length of K (K represents an object category number herein) and a four-dimensional frame regression target will be given to each anchor. The RetinaNet target detection model specifically uses an assignment rule in the RPN, which is modified according to multi-classification detection and has an adjusted threshold.

The classification subnet adopted in the RetinaNet target detection model can carry out probability prediction on each category (assuming that there are K categories) of each anchor (assuming that there are A anchors) at each position. This classification subnet is a small FCN; and a parameter of this classification subnet is shared at all pyramid levels (i.e., between the layers of the whole pyramid). A design mode of the classification subnet is that: an input feature map with C channels is obtained from a given pyramid level, this classification subnet firstly passes through four 3*3 convolution layers, each convolution layer has C filters, each convolution layer follows a ReLU activation function, then the classification subnet is connected with one 3*3 convolution layer with KA filters, finally, a sigmoid activation function is adopted to output KA binary classification predicted values for each position, and in the practical application, a C value and an A value can be set by the self, and for example, can be set as that C=256, A=9 and the like.

The regression subnet adopted in the RetinaNet target detection model is in parallel to the classification subnet, i.e., each level of the pyramid is connected with another small FCN in order to regress an offset of each anchor for an adjacent ground truth object (which is a datum reference target). A design mode of the regression subnet is the same as the classification subnet, and the difference is that the regression subnet outputs 4A linear outputs for each position. For A anchors corresponding to each position, four outputs predict a relative offset of the anchors and a datum reference. The regression subnet and the classification subnet in the RetinaNet target detection model have the same network structures, but respectively adopt different network parameters.

On basis of the above-mentioned knowing for the RetinaNet target detection model, the fourth target detection model as shown in FIG. 6 is obtained by newly adding the metanet on the basis of the RetinaNet target detection model, and specifically, is respectively that the classification subnet is connected with the first metanet, and the regression subnet is connected with the second metanet.

Both the specific structure of the first metanet and the specific structure of the second metanet can be implemented by adopting a fully connected layer, and in consideration of a case of where the network layer number is more and more deeper or a width (output dimension) of the network is more and more greater, a fitting ability of the metanet is more and more higher, in order to enable the metanet to have a higher fitting ability, on this basis, both the first metanet and the second metanet include at least two fully connected layers. Specifically, the classification layer network parameter output by an end fully connected layer of the first metanet is related to an output channel number, an input channel number and a convolution kernel size of the classification subnet. For example, the output channel number of the classification subnet is related to the type number of the anchors input into the first metanet and an output category number of the classification subnet; and the regression layer network parameter output by an end fully connected layer of the second metanet is related to an output channel number, an input channel number, and a convolution kernel size of the regression subnet. For example, the output channel number of the regression subnet is related to the type number of the anchors input into the second metanet and the number of position parameters of the target object output by the regression subnet. By taking the classification layer network parameter as an example, assuming that the output channel number of the classification subnet is O, the input channel number of the classification subnet is I and the convolution kernel size of the classification subnet is K, the classification layer network parameter can be represented as a 4D vector (O, I, K, K). The output channel number therein is related to the type number N of the anchors and the output category number M, and specifically, the output channel number of the classification layer network parameter is that O=N*M; and the regression layer network parameter is also a 4D vector, but the output channel number of the regression layer network parameter is related to the type number N of the anchors and the number of the output position parameters, in one implementation mode, 4 types of position parameters are output by the regression subnet, and respectively are offsets of a regression frame with respect to a center point (x, y), a height h and a width w of the anchors, and thus, the output channel number related to the regression layer network parameter is that O=4*N.

Assuming that the target detection model provided by the embodiment uses the anchors corresponding to N groups of different scales and aspects (one group of scale and aspect determines one type of anchors, i.e., the type number of the anchors is N) to detect the object, an input of the metanet is a 2D vector (N, 2), where N represents the group number of the input anchors, and 2 represents two values of the anchor scale and the anchor aspect ratio. Namely, the input of the metanet is N types of anchor parameters, an output of the metanet is the network parameter of the connected subnet, and specifically, the output of the first metanet (MetaNetcls) connected with the Cls layer is the parameter of the Cls layer; and the output of the second metanet (MetaNetreg) connected with the Reg layer is the parameter of the Reg layer.

In order to facilitate understanding, a specific implementation mode of the first metanet and the second metanet will be provided as following:

The first metanet can have three network layers which respectively are an input layer, a first fully connected layer FC1 and a second fully connected layer FC2. For example, an output dimension of the input layer is 2, an output dimension of the first fully connected layer FC1 is 128, and an output dimension of the second fully connected layer FC2 is 184320. For N types of anchors input into the first metanet, the input layer is N*2, when the anchors pass through the first fully connected layer FC1, an output of the first fully connected layer FC1 is N*128, then the anchors pass through the second fully connected layer FC2, and an output of the second fully connected layer FC2 is N*184320.

The network structure of the second metanet is the same as the first metanet, and can also have three network layers which respectively are an input layer, a first fully connected layer FC1 and a second fully connected layer FC2. For example, an output dimension of the input layer is 2, an output dimension of the first fully connected layer FC1 is 128, and an output dimension of the second fully connected layer FC2 is 9216. For N types of anchors input into the second metanet, the input layer is N*2, when the anchors pass through the first fully connected layer FC1, an output of the first fully connected layer FC1 is N*128, then the anchors pass through the second fully connected layer FC2, and an output of the second fully connected layer FC2 is N*9216.

In order to facilitate understanding, a corresponding relationship of an output of the metanet and a convolution layer parameter of the subnet will be further explained below: assuming that the category number is that M=80 and the convolution kernel size is 3, the output dimension of the FC2 of the first metanet is 184320 (80×256×3×3=184320); and assuming that the number of regression frame parameters (offsets of the regression frame with respect to the anchors) is 4, and the regression frame parameters specifically are the offsets with respect to the center point (x, y), the height h and the width w of the anchors, the output dimension of the FC2 of the second metanet is 9216 (4×256×3×3=9216). It should be noted that a layer network parameter of the Cls layer is a 4D vector (O, I, K, K), where O represents an output channel number of the Cls layer, I represents an input channel number of the Cls layer, and K represents a convolution kernel size of the Cls layer. For the output of the first metanet, which is N*184320, parameters (80N, 256, 3, 3) of the Cls layer can be formed by reshaping into a 4D vector. For the output of the second metanet, which is N*9216, parameters (4N, 256, 3, 3) of the Reg layer can be formed by reshaping into a 4D vector.

Specifically, the output of the FC2 of the first metanet is a convolution parameter of the Cls layer, and the parameter can be used for carrying out calculation on the feature map (with a dimension of 256*H*W) transmitted by four previous convolution layers in the classification subnet as shown in FIG. 6. Specifically, the Cls layer has an effect of acting an 80N*256*3*3 parameter on the 256*H*W feature map to obtain an 80N*H*W final output result. The output of the FC2 of the second metanet is a convolution parameter of the Reg layer, the parameter can be used for carrying out calculation on the feature map (with a dimension of 256*H*W) transmitted by four previous convolution layers in the regression subnet as shown in FIG. 6, and specifically, the Cls layer has an effect of acting a 4N*256*3*3 parameter on the 256*H*W feature map to obtain a 4N*H*W final output result.

It should be noted that the above numbers merely are schematic illustrations of one specific implementation mode, and can be flexibly changed in the practical application. For example, the output dimension of the FC1 may also be 256 or other values, all of the above-mentioned category, output channel number, input channel number, convolution kernel size and the like can be set as other values, and the output dimension of the FC2 may also be correspondingly changed, which are not repeated herein.

In order to clearly illustrate the detection advantages of the above-mentioned fourth target detection model obtained by directly adding the metanet in the RetinaNet target detection model compared to the RetinaNet target detection model without the metanet, an inventor makes a comparative test on a detection data set of a COCO object detection task, and the specifics can refer to detection result comparison data of the target detection model and the RetinaNet target detection model, which can be shown in Table 1.

TABLE 1

| Detection Model | Backbone | Image Size | AP | $AP_{50}$ | $AP_{75}$ | $AP_S$ | $AP_M$ | $AP_L$ |
|---|---|---|---|---|---|---|---|---|
| RetinaNet | ResNet-50-FPN | 600 | 34.3 | 53.2 | 36.9 | 16.2 | 37.4 | 47.4 |
| Target Detection Model Provided by the Embodiment | ResNet-50-FPN | 600 | 36.2 | 54.5 | 39.0 | 19.3 | 40.4 | 50.1 |

For example, the target detection model provided by the embodiment, i.e., the above-mentioned fourth target detection model, is a target detection model further improved on the basis of the RetinaNet target detection model, and specifically added with the metanet which can receive the anchor parameters from the outside and generate the classification/regression subnet on the basis of the anchor parameters. The backbone networks adopted by the RetinaNet target detection model and the target detection model provided by the embodiment, have the same FPN architecture, i.e., ResNet-50-FPN; and both the image sizes are 600, and specifically, 600 represents an image pixel value. It shows that the higher a metric value AP of the detection result is, the higher detection performance is and the higher detection accuracy is. It can be clearly seen from Table 1 that the APs (AP, $AP_{50}$, $AP_{75}$, $AP_S$, $AP_M$ and $AP_L$) of the target detection model provided by the embodiment under various metrics are all higher than those of the RetinaNet target detection model, and detection accuracy is promoted and is promoted by 5.5% compared to detection accuracy of the RetinaNet target detection model. By this comparison result, feasibility and superiority of the detection performance of the target detection model provided by the embodiment can be sufficiently proved.

By taking a case of comparing the fourth target detection model provided by the embodiment to the RetinaNet target detection model as an example, the advantages of the target detection method provided by the embodiment will be illustrated in various aspects below:

(1) In the training stage, the metanet (which can also be called as a MetaNet module) of the target detection model provided by the embodiment can use a classification loss function and a regression loss function of the overall network to update parameters of the metanet, and the RetinaNet target detection model (i.e., the target detection module provided by the embodiment) including the MetaNet module can sample different types of anchor parameters (aspects and scales) by the MetaNet module to cover all the object positive samples. Because the different aspects and scale values can generate different object training positive samples, and thus, those object positive samples with extreme proportions can also be added into the training of the network. However, the anchor aspect ratios and the anchor scales of the RetinaNet target detection model are fixed values, and thus, for the RetinaNet target detection model, those extreme object samples with extreme proportions cannot be added into the training process of network. In contrast, the target detection model provided by the embodiment has a higher object sample coverage rate and is more beneficial for detecting out objects with special proportions.

(2) For the RetinaNet target detection model, after the training stage, the parameters of the Cls layer and the Reg layer will be fixed and unchanged, and in the subsequent test stage and practical application stage, the RetinaNet target detection model is limited to the fixed anchor types. However, the parameters of the Cls and Reg layers of the RetinaNet target detection model including the MetaNet module can be correspondingly changed by modifying inputs of the anchor aspect ratios and the anchor scales, can implement the dynamic detection on the basis of more types of anchors, and promote the detection performance.

(3) The anchor types adopted by the RetinaNet target detection model are limited and the anchors are all regarded as discrete anchors, and thus, the RetinaNet target detection model is difficult to detect out the object frame positioned at two discrete anchors and is low in detection accuracy. The RetinaNet target detection model including the MetaNet module provided by the embodiment, can sample values of many groups of anchor aspect ratios and anchor scales by the MetaNet module to increase the types of the anchors to sufficiently improve the coverage rate of the anchors. Specifically, multiple groups of anchor aspect ratios and anchor scales are in a discrete relationship, and for example, only 9 groups or 25 groups are input for once generally, but various anchors (the group number can be fixed, and the type number of the anchors can be changed) can be obtained by a repeated sampling mode, the proportional spacing among the anchor aspect ratios corresponding to various anchors is relatively small, the scale difference among the anchor scales is also relatively low, thereby forming a plurality of dense anchors, and the dense anchors are helpful for covering various different object positive samples and are also helpful for covering an object with a random shape, so as to effectively promote object detection accuracy.

(4) The anchor types adopted by the RetinaNet target detection model in the training stage are limited, and once training is ended, cannot be changed later. The RetinaNet target detection module including the MetaNet module provided by the embodiment, can still modify the anchor types at any time by inputting the anchor parameters to the MetaNet module in the test stage and the practical application stage after the training stage, in addition, the group number of the anchor parameters input to the MetaNet module in the test stage may also be different from that of the anchor parameters input to the MetaNet module in the training stage, and specifically, the group number of the input anchor parameters can also be increased in the subsequent test stage. Namely, in the test stage, the anchor types and the type number which are input to the target detection model can be modified as required, the anchors which are not used in the training stage are adopted to detect the object, so that the scale range of anchor coverage is enlarged, and the introduction and setting of the anchor parameters are more flexible, thereby further improving detection accuracy of the network.

Besides the above-mentioned advantages, the embodiment introduces the metanet, can centrally process the anchor parameters, and generate the layer network parameter required by the subnet for outputting the detection result. Compared to the target detection model without the metanet, which needs the overall network to participate in calculating and adjusting the parameter if the anchor types need to be increased, and the training is relatively more difficult and the calculation complexity is relatively higher, and such mode adopted by the embodiment is relatively small in calculated amount and relatively low in training difficulty.

In summary, the target detection model provided by the embodiment can well increase the anchor types in a mode of setting the metanet, promotes the object sample coverage rate and has high detection performance and high detection accuracy.

Figure 8:
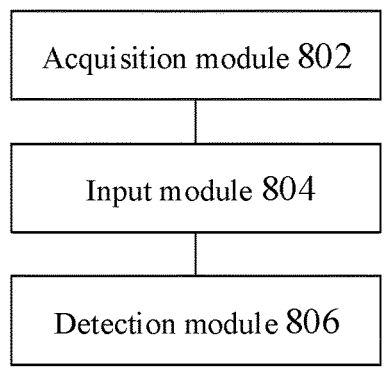
FIG. 8 shows a structural block diagram of a target detection apparatus provided by embodiments of the present disclosure.

For the above-mentioned provided target detection method, at least an embodiment of the present disclosure provides a target detection apparatus, with reference to a structural block diagram of the target detection apparatus as shown in FIG. 8, which includes that:

An acquisition module 802 is configured to acquire an image to be detected and a preset anchor parameter. For example, the anchor parameter is a parameter of an anchor set on the image to be detected. In an example, the acquisition module 802 includes a search unit, which is configured to search various original anchor parameters that has been stored; and further includes a parameter adding unit, which is configured to add a new anchor parameter on the basis of the various original anchor parameters according to a preset parameter expansion mode to reach the anchor parameters of preset type number.

In an example, the parameter adding unit is used for carrying out sorting on the various original anchor parameters according to the size of anchor scales and/or the size of anchor aspect ratios; and carrying out interpolation processing between two adjacent original anchor parameters to add one or more new anchor parameters, until reaching the anchor parameters of preset type number. In another example, the parameter adding unit is used for determining a maximum anchor scale, a minimum anchor scale, a maximum anchor aspect ratio and a minimum anchor aspect ratio in the original anchor parameters; and adding new anchor parameters of which anchor scales are greater than the maximum anchor scale, and/or, adding new anchor parameters of which anchor scales are smaller than the minimum anchor scale, and/or, adding new anchor parameters of which anchor aspect ratios are greater than the maximum anchor aspect ratio, and/or, adding new anchor parameters of which anchor aspect ratios are smaller than the minimum anchor aspect ratio, until reaching the anchor parameters of preset type number.

In another implementation mode, the acquisition module 802 is further configured to acquire a preset anchor parameter set. For example, the anchor parameter set includes various anchor parameters; in the various anchor parameters, a minimum difference of two anchor scales is lower than a preset first difference, and a maximum difference of two anchor scales is higher than a preset second difference; and/or, a minimum difference of two anchor aspect ratios is lower than a preset third difference, and a maximum difference of two anchor aspect ratios is higher than a preset fourth difference. The acquisition module 802 is further configured to select the anchor parameters of preset type number from the anchor parameter set.

An input module 804 is used for inputting the image to be detected and the anchor parameter into a target detection model.

A detection module 806 is used for carrying out target detection on the image to be detected on the basis of the anchor parameter by the target detection model to obtain a detection result. For example, the detection result includes a category and/or a position of a target included in the image to be detected.

To the above-mentioned target detection apparatus provided by the embodiment of the present disclosure, can input the various acquired anchor parameters into the target detection model when target detection is carried out on the image to be detected, so that the target detection model carries out target detection on the image to be detected on the basis of the anchor parameters. Compared to a target detection model limited to inherent anchor types of a network, the above-mentioned apparatus provided by the embodiment can enable the target detection model to acquire the anchor parameters from the outside when carrying out target detection, and is convenient to increase the types of the anchors participating in target detection so as to promote the object sample coverage rate, thereby well promoting accuracy of target detection.

In one implementation mode, the above-mentioned target detection model includes a backbone network and a subnet connected with the backbone network, and further includes a metanet connected with the subnet, and an input of the backbone network is the image to be detected, and an output of the backbone network is a feature map of the image to be detected; an input of the metanet is the anchor parameter, and an output of the metanet is a layer network parameter of the subnet; and inputs of the subnet are the feature map and the layer network parameter, and an output of the subnet is the detection result.

Based on the above-mentioned target detection model, the above-mentioned detection module includes that: a feature extraction unit is used for carrying out feature extraction on the input image to be detected by the backbone network, to obtain the feature map of the image to be detected, and inputting the feature map into the subnet; a parameter generation unit is used for carrying out nonlinear mapping processing on the input anchor parameter by the metanet, to obtain the layer network parameter of the subnet, and inputting the layer network parameter into the subnet; and a detection unit is used for carrying out classification processing on the feature map on the basis of the layer network parameter by the subnet and determining the category of the target object in the image to be detected, and/or, carrying out regression processing on the feature map on the basis of the layer network parameter and determining the position of the target object in the image to be detected.

In another implementation mode, the above-mentioned subnet includes a classification subnet and a regression subnet; and the metanet includes a first metanet and a second metanet. For example, the first metanet is connected with the classification subnet, and the second metanet is connected with the regression subnet; the layer network parameter includes a classification layer network parameter and a regression layer network parameter. On this basis, the above-mentioned parameter generation unit is used for carrying out nonlinear mapping processing on the input anchor parameters by the first metanet, to obtain the classification layer network parameter, and inputting the classification layer network parameter into the classification subnet; and carrying out nonlinear mapping processing on the input anchor parameters by the second metanet, to obtain the regression layer network parameter, and inputting the regression layer network parameter into the regression subnet.

In the specific implementation, the above-mentioned classification subnet includes a plurality of convolution layers, and the first metanet is connected with a classification result output layer of the classification subnet. For example, the classification layer network parameter is a network parameter of the classification result output layer; the classification result output layer is an end convolution layer in the plurality of convolution layers in the classification subnet; the regression subnet includes a plurality of convolution layers; and the second metanet is connected with a regression result output layer of the regression subnet. For example, the regression layer network parameter is a network parameter of the regression result output layer; and the regression result output layer is an end convolution layer in the plurality of convolution layers in the regression subnet.

In one implementation mode, both the above-mentioned first metanet and second metanet include at least two fully connected layers.

The classification layer network parameter output by an end fully connected layer of the first metanet includes an output channel number, an input channel number and a convolution kernel size of the classification subnet. For example, the output channel number of the classification subnet is related to the type number of the anchors input to the first metanet and an output category number of the classification subnet.

The regression layer network parameter output by an end fully connected layer of the second metanet is related to an output channel number, an input channel number, and a convolution kernel size of the regression subnet. For example, the output channel number of the regression subnet is related to the type number of the anchors input into the second metanet and the number of position parameters of the target object output by the regression subnet.

In the practical application, the anchor parameters input into the target detection model when the target detection model is used are the same as or different from those input into the target detection model when the target detection model is trained.

In the specific implementation, the backbone network may be a FPN, and a plurality of subnets are provided. For example, the number of the subnets corresponds to scale types of the feature maps output by the FPN.

The implementation principle and the generated technical effects of the apparatus provided by this embodiment are the same as those of the above-mentioned embodiment, and in order to briefly describe, what is not mentioned about the apparatus provided by the embodiment can refer to the corresponding contents in the above-mentioned method embodiment.

Moreover, at least an embodiment provides a target detection system. The system includes: an image acquisition apparatus, a processor and a storage apparatus; the image acquisition apparatus is configured to acquire an image to be detected; one or more computer programs are stored on the storage apparatus, and the computer program executes the target detection method provided by the above-mentioned embodiment when being operated by the processor.

Those skilled in the art can clearly know that in order to conveniently and briefly describe, the specific working process of the above-mentioned described system can refer to the corresponding process in the above-mentioned embodiment, and is not repeated in this aspect again.

Figure 9:
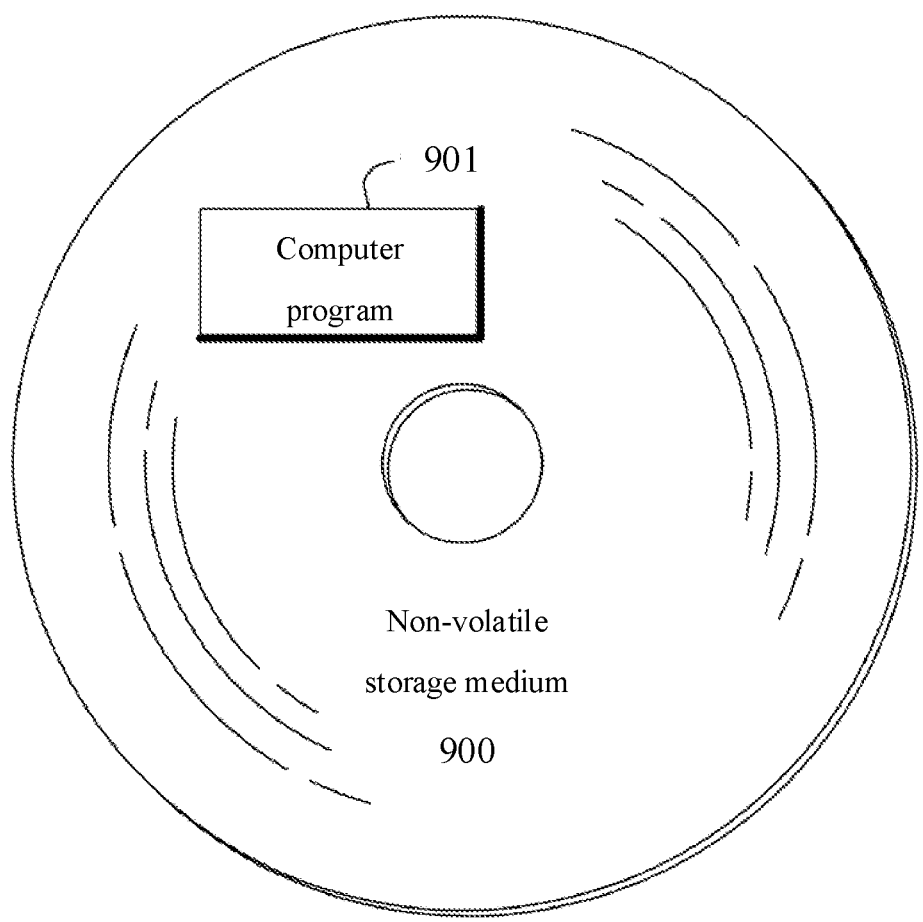
FIG. 9 shows a schematic diagram of a non-volatile storage medium provided by embodiments of the present disclosure.

FIG. 9 shows a schematic diagram of a non-volatile storage medium provided by embodiments of the present disclosure. At least an embodiment provides a computer readable non-volatile storage medium 900, which stores a computer program 901 in a non-transitory mode, and executes the method provided by the above-mentioned embodiment when the computer program 901 is operated by a processor.

For example, the storage medium may be a random combination of one or more computer readable storage media, and for example, one computer readable storage medium includes a computer readable program code for acquiring an image to be detected and a preset anchor parameter, and another computer readable storage medium includes a computer readable program code for carrying out the target detection on the image to be detected on the basis of the anchor parameter by a target detection model.

The computer program product of the target detection method, apparatus and system provided by the embodiments of the present disclosure include the non-volatile storage medium storing the program code, an readable instruction included in the program code can be used for executing the method in the previous method embodiment, and the specific implementation can refer to the method embodiment and is not repeated herein again. If the function is achieved in a form of a software functional unit and is sold or used as an independent product, the function can be stored in a computer readable storage medium. On the basis of such understanding, the technical solutions of the present disclosure essentially or a part making a contribution to the prior art or a part of the technical solutions can be shown in a form of a software product, and the computer software product is stored in a storage medium and includes a plurality of instructions for enabling a computer device (which may be a personal computer, a server, or a network device and the like) to execute all or part of the method in each embodiment of the present disclosure. The above-mentioned non-volatile storage media includes various media which can store the program code, such as a U disk, a mobile hard disk, a Read-Only Memory (ROM), a diskette or a compact disc and the like, and may also be other applicable storage media.

Finally, it should be illustrated that: the foregoing embodiments merely are specific embodiments of the disclosure, used for illustrating the technical solutions of the disclosure, but not intended to define the disclosure, and the scope of the disclosure is not limited thereto. Although the disclosure is illustrated in detail with reference to the above-mentioned embodiments, those skilled in the art should understand that: those skilled in the art, in the technical scope disclosed by the present disclosure, can still make modifications or easily think of variations to the technical solutions recorded in the foregoing embodiment, or make equivalent replacements to part of technical characteristics therein; and those modifications, variations or replacements, does not enable the essences of the corresponding technical solutions to depart from the spirit and scope of the technical solutions of the embodiments of the present disclosure, and shall fall within the scope of the present disclosure. Therefore, the scope of the present disclosure shall be determined by the scope of the claims.

What is claimed is:

1. A target detection method, comprising:
acquiring an image to be detected and anchor parameters of a preset type number, wherein the anchor parameters are parameters of an anchor set on the image to be detected, and each type of the anchor parameters comprises an anchor scale and an anchor aspect ratio;
inputting the image to be detected and the anchor parameters into a target detection model to increase a set of types of anchors participating in target detection; and
carrying out target detection on the image to be detected on basis of the anchor parameters by the target detection model to obtain a detection result, the detection result including at least one of a category or a position of a target object included in the image to be detected;
wherein the target detection model comprises a backbone network and a subnet connected with the backbone network, and further comprises a metanet connected with the subnet, wherein:
an input of the backbone network is the image to be detected, and an output of the backbone network is a feature map of the image to be detected,
an input of the metanet is the anchor parameter, and an output of the metanet is a layer network parameter of the subnet,
an input of the subnet are the feature map and the layer network parameter, and
an output of the subnet is the detection result;
wherein carrying out target detection on the image to be detected on the basis of the anchor parameters by the target detection model to obtain the detection result comprises:
carrying out feature extraction on the input image to be detected by the backbone network, to obtain the feature map of the image to be detected, and inputting the feature map into the subnet,
carrying out nonlinear mapping processing on the input anchor parameters by the metanet, to obtain the layer network parameter of the subnet, and inputting the layer network parameter into the subnet, and
carrying out classification processing on the feature map on the basis of the layer network parameter by the subnet, and determining the category of the target object in the image to be detected, and/or, carrying out regression processing on the feature map on the basis of the layer network parameter, and determining the position of the target object in the image to be detected;
wherein the subnet comprises a classification subnet and a regression subnet, and the metanet comprises a first metanet and a second metanet which are independent from each other;
wherein the first metanet is connected with the classification subnet, and the second metanet is connected with the regression subnet;
wherein the layer network parameter comprises a classification layer network parameter and a regression layer network parameter; and wherein carrying out nonlinear mapping processing on the input anchor parameters by the metanet, to obtain the layer network parameter of the subnet, and inputting the layer network parameter into the subnet, comprises:
carrying out nonlinear mapping processing on the input anchor parameters by the first metanet, to obtain the classification layer network parameter, and inputting the classification layer network parameter into the classification subnet, and
carrying out nonlinear mapping processing on the input anchor parameters by the second metanet, to obtain the regression layer network parameter, and inputting the regression layer network parameter into the regression subnet.

2. The method according to claim 1, wherein the classification subnet comprises a plurality of convolution layers, and the first metanet is connected with a classification result output layer of the classification subnet, wherein the classification layer network parameter is a network parameter of the classification result output layer; and the classification result output layer is an end convolution layer in the plurality of convolution layers in the classification subnet;
the regression subnet comprises a plurality of convolution layers; and the second metanet is connected with a regression result output layer of the regression subnet, wherein the regression layer network parameter is a network parameter of the regression result output layer; and the regression result output layer is an end convolution layer in the plurality of convolution layers in the regression subnet.

3. The method according to claim 1, wherein both the first metanet and the second metanet comprise at least two fully connected layers;
the classification layer network parameter output by an end fully connected layer of the first metanet is related to an output channel number, an input channel number and a convolution kernel size of the classification subnet, wherein the output channel number of the classification subnet is related to the type number of the anchors input into the first metanet and an output category number of the classification subnet; and
the regression layer network parameter output by an end fully connected layer of the second metanet is related to an output channel number, an input channel number, and a convolution kernel size of the regression subnet, wherein the output channel number of the regression subnet is related to the type number of the anchors input into the second metanet and the number of position parameters of the target object output by the regression subnet.

4. The method according to claim 1, wherein acquiring the anchor parameters of preset type number comprises:
searching various original anchor parameters that have been stored; and
adding new anchor parameters on the basis of the various original anchor parameters according to a preset parameter expansion mode to reach the anchor parameters of preset type number.

5. The method according to claim 4, wherein adding the new anchor parameters on the basis of the various original anchor parameters according to the preset parameter expansion mode to reach the anchor parameters of preset type number, comprises:
carrying out sorting on the various original anchor parameters according to a size of the anchor scale and/or a size of the anchor aspect ratio; and carrying out interpolation processing between two adjacent original anchor parameters to add one or more new anchor parameters, until reaching the anchor parameters of preset type number.

6. The method according to claim 4, wherein adding the new anchor parameters on the basis of the various original anchor parameters according to the preset parameter expansion mode to reach the anchor parameters of preset type number, comprises:

determining a maximum anchor scale, a minimum anchor scale, a maximum anchor aspect ratio and a minimum anchor aspect ratio in the original anchor parameters; and adding new anchor parameters of which anchor scales are greater than the maximum anchor scale, and/or, adding new anchor parameters of which anchor scales are smaller than the minimum anchor scale, and/or, adding new anchor parameters of which anchor aspect ratios are greater than the maximum anchor aspect ratio, and/or, adding new anchor parameters of which anchor aspect ratios are smaller than the minimum anchor aspect ratio, until reaching the anchor parameters of preset type number.

7. The method according to claim 1, wherein acquiring the anchor parameters of preset type number, comprises:

acquiring a preset anchor parameter set, wherein the anchor parameter set comprises various anchor parameters; in the various anchor parameters, a minimum difference of two anchor scales is lower than a preset first difference, and a maximum difference of two anchor scales is higher than a preset second difference; and/or, a minimum difference of two anchor aspect ratios is lower than a preset third difference, and a maximum difference of two anchor aspect ratios is higher than a preset fourth difference; and selecting the anchor parameters of preset type number from the anchor parameter set.

8. The method according to claim 1, wherein the anchor parameters input into the target detection model when the target detection model is used are the same as or different from those input into the target detection model when the target detection model is trained.

9. The method according to claim 1, wherein the backbone network is a feature pyramid network, a plurality of subnets are provided, and each subnet is connected with the metanet, wherein the number of the subnets corresponds to scale types of the feature maps output by the feature pyramid.

10. A target detection system, comprising:

an image acquisition apparatus configured to acquire an image to be detected;

a processor;

a storage apparatus; and one or more computer programs stored on the storage apparatus that, upon execution by the processor, cause the processor to:

acquire an image to be detected and anchor parameters of a preset type number, wherein the anchor parameters are parameters of an anchor set on the image to be detected, and each type of the anchor parameters comprises an anchor scale and an anchor aspect ratio, input the image to be detected and the anchor parameters into a target detection model to increase a set of types of anchors participating in target detection, and carry out target detection on the image to be detected on basis of the anchor parameters by the target detection model to obtain a detection result, the detection result including at least one of a category or a position of a target object included in the image to be detected;

wherein the target detection model comprises a backbone network, a subnet connected with the backbone network, and a metanet connected with the subnet;

wherein an input of the backbone network is the image to be detected, and an output of the backbone network is a feature map of the image to be detected;

wherein an input of the metanet is the anchor parameter, and an output of the metanet is a layer network parameter of the subnet;

wherein an input of the subnet are the feature map and the layer network parameter, and an output of the subnet is the detection result;

wherein carrying out target detection on the image to be detected on the basis of the anchor parameters by the target detection model to obtain the detection result comprises:

carrying out feature extraction on the input image to be detected by the backbone network, to obtain the feature map of the image to be detected, and inputting the feature map into the subnet, carrying out nonlinear mapping processing on the input anchor parameters by the metanet, to obtain the layer network parameter of the subnet, and inputting the layer network parameter into the subnet, and carrying out classification processing on the feature map on the basis of the layer network parameter by the subnet, and determining the category of the target object in the image to be detected, and/or, carrying out regression processing on the feature map on the basis of the layer network parameter, and determining the position of the target object in the image to be detected;

wherein the subnet comprises a classification subnet and a regression subnet, and the metanet comprises a first metanet and a second metanet which are independent from each other;

wherein the first metanet is connected with the classification subnet, and the second metanet is connected with the regression subnet;

wherein the layer network parameter comprises a classification layer network parameter and a regression layer network parameter; and wherein carrying out nonlinear mapping processing on the input anchor parameters by the metanet, to obtain the layer network parameter of the subnet, and inputting the layer network parameter into the subnet, comprises:

carrying out nonlinear mapping processing on the input anchor parameters by the first metanet, to obtain the classification layer network parameter, and inputting the classification layer network parameter into the classification subnet, and carrying out nonlinear mapping processing on the input anchor parameters by the second metanet, to obtain the regression layer network parameter, and inputting the regression layer network parameter into the regression subnet.

11. The target detection system according to claim 10, wherein acquiring the anchor parameters of preset type number, comprises:

searching various stored original anchor parameters; and adding new anchor parameters on the basis of the various original anchor parameters according to a preset parameter expansion mode to reach the anchor parameters of preset type number.

12. The target detection system according to claim 11, wherein adding the new anchor parameters on the basis of the various original anchor parameters according to the preset parameter expansion mode to reach the anchor parameters of preset type number, comprises:
   carrying out sorting on the various original anchor parameters according to a size of the anchor scale and/or a size of the anchor aspect ratio; and
   carrying out interpolation processing between two adjacent original anchor parameters to add one or more new anchor parameters, until reaching the anchor parameters of preset type number.

13. The target detection system according to claim 11, wherein adding the new anchor parameters on the basis of the various original anchor parameters according to the preset parameter expansion mode to reach the anchor parameters of preset type number, comprises:
   determining a maximum anchor scale, a minimum anchor scale, a maximum anchor aspect ratio and a minimum anchor aspect ratio in the original anchor parameters; and
   adding new anchor parameters of which anchor scales are greater than the maximum anchor scale, and/or, adding new anchor parameters of which anchor scales are smaller than the minimum anchor scale, and/or, adding new anchor parameters of which anchor aspect ratios are greater than the maximum anchor aspect ratio, and/or, adding new anchor parameters of which anchor aspect ratios are smaller than the minimum anchor aspect ratio, until reaching the anchor parameters of preset type number.

14. A computer readable non-volatile storage medium, storing a computer program in a non-transitory mode, and executing a target detection method when the computer program is operated by a processor, comprising:
   acquiring an image to be detected and anchor parameters of a preset type number, wherein the anchor parameters are parameters of an anchor set on the image to be detected, and wherein each type of the anchor parameters comprises an anchor scale and an anchor aspect ratio;
   inputting the image to be detected and the anchor parameters into a target detection model to increase a set of types of anchors participating in target detection; and
   carrying out target detection on the image to be detected on basis of the anchor parameters by the target detection model to obtain a detection result, the detection result including at least one of a category or a position of a target object included in the image to be detected;
   wherein the target detection model comprises a backbone network and a subnet connected with the backbone network, and further comprises a metanet connected with the subnet, wherein:
   an input of the backbone network is the image to be detected, and an output of the backbone network is a feature map of the image to be detected,
   an input of the metanet is the anchor parameter, and an output of the metanet is a layer network parameter of the subnet,
   an input of the subnet are the feature map and the layer network parameter, and
   an output of the subnet is the detection result;
   wherein carrying out target detection on the image to be detected on the basis of the anchor parameters by the target detection model to obtain the detection result comprises:
   carrying out feature extraction on the input image to be detected by the backbone network, to obtain the feature map of the image to be detected, and inputting the feature map into the subnet,
   carrying out nonlinear mapping processing on the input anchor parameters by the metanet, to obtain the layer network parameter of the subnet, and inputting the layer network parameter into the subnet, and
   carrying out classification processing on the feature map on the basis of the layer network parameter by the subnet, and determining the category of the target object in the image to be detected, and/or, carrying out regression processing on the feature map on the basis of the layer network parameter, and determining the position of the target object in the image to be detected;
   wherein the subnet comprises a classification subnet and a regression subnet; and the metanet comprises a first metanet and a second metanet which are independent from each other,
   wherein the first metanet is connected with the classification subnet, and the second metanet is connected with the regression subnet;
   wherein the layer network parameter comprises a classification layer network parameter and a regression layer network parameter; and
   wherein carrying out nonlinear mapping processing on the input anchor parameters by the metanet, to obtain the layer network parameter of the subnet, and inputting the layer network parameter into the subnet, comprises:
   carrying out nonlinear mapping processing on the input anchor parameters by the first metanet, to obtain the classification layer network parameter, and inputting the classification layer network parameter into the classification subnet, and
   carrying out nonlinear mapping processing on the input anchor parameters by the second metanet, to obtain the regression layer network parameter, and inputting the regression layer network parameter into the regression subnet.

* * * * *